United States Patent [19]

Hackenberg

[11] Patent Number: 4,600,817
[45] Date of Patent: Jul. 15, 1986

[54] APPARATUS FOR GUIDING FLEXIBLE SUPPLY LINES

[75] Inventor: Willi Hackenberg, Eichstatt, Fed. Rep. of Germany

[73] Assignee: Schubert & Salzer, Ingolstadt, Fed. Rep. of Germany

[21] Appl. No.: 550,931

[22] Filed: Nov. 10, 1983

[30] Foreign Application Priority Data

Nov. 12, 1982 [DE] Fed. Rep. of Germany ....... 3241924

[51] Int. Cl.$^4$ ...................... H02G 11/00; F16G 13/16
[52] U.S. Cl. .................................. 191/12 C; 59/78.1; 248/51
[58] Field of Search ................ 59/78.1, 84; 191/12 R, 191/12 C; 198/815; 248/49, 51, 75; 254/265, 387, 388, 390, 392

[56] References Cited

U.S. PATENT DOCUMENTS

| 2,633,977 | 4/1953 | McMillan | 198/815 |
|---|---|---|---|
| 3,248,487 | 4/1966 | Dechantsreiter | 191/12 C |
| 3,273,057 | 9/1966 | Peterson et al. | 191/12 C X |
| 3,551,612 | 12/1970 | Guentner | 191/12 C |
| 3,630,325 | 12/1971 | Corl et al. | 191/12 C |
| 3,782,670 | 1/1974 | Kielma | 248/51 |
| 4,111,573 | 9/1978 | Pryor et al. | 198/815 X |
| 4,129,277 | 12/1978 | Tenniswood | 248/51 |
| 4,198,812 | 4/1980 | Hennig et al. | 59/78.1 |
| 4,392,344 | 7/1983 | Gordon et al. | 59/78.1 |
| 4,462,565 | 7/1984 | Johnson | 248/51 |

FOREIGN PATENT DOCUMENTS 1095198 12/1960 Fed. Rep. of Germany ...... 198/815

Primary Examiner—David A. Scherbel
Assistant Examiner—David F. Hubbuch
Attorney, Agent, or Firm—Dority & Manning

[57] ABSTRACT

A mobile supply station (7) is connected by flexible supply lines (10, 11) to a stationary connection point (1). The flexible supply lines (10, 11) are supported by a guide chain (2), the surplus length of which is taken up and laid down in a loop (21) during the movement of the supply station (7). The curvature of the loop (21) is dictated by a return wheel which rolls freely upon that part of the guide chain (2) connected to the stationary connection point (1).

21 Claims, 4 Drawing Figures

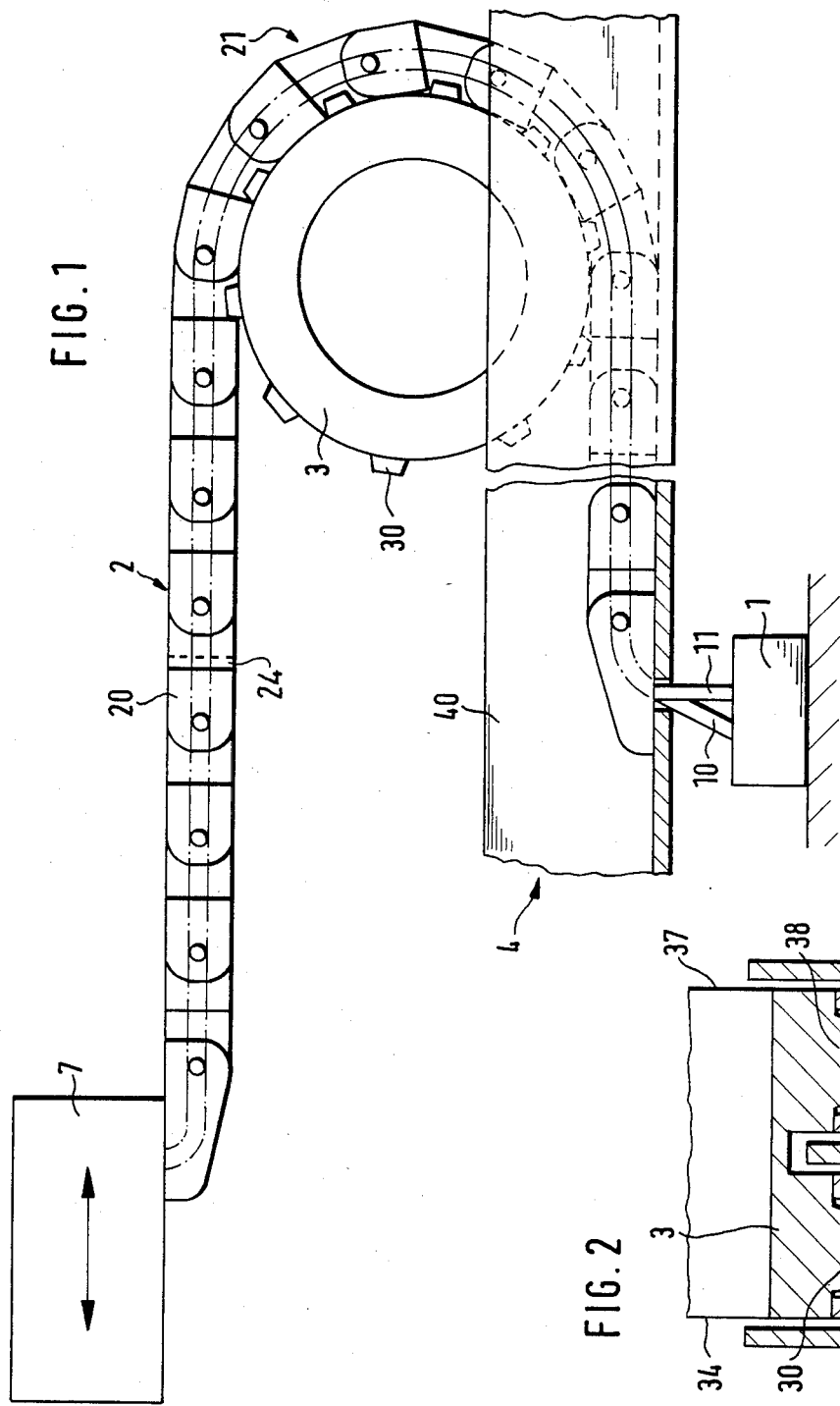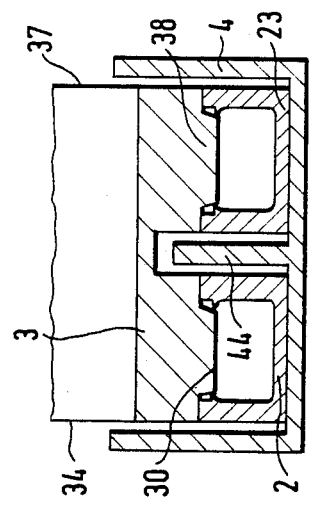

APPARATUS FOR GUIDING FLEXIBLE SUPPLY LINES

BACKGROUND OF THE INVENTION

This invention relates to an apparatus for guiding flexible supply lines which are supported by a guide chain which is connected to a stationary connection point on the one hand and to a mobile supply station on the other hand, and the surplus length of which is taken up and laid down in a loop during the movement of the supply station.

Drag chains of this type consist of a plurality of chain links, within which flexible supply lines are guided (see German Utility Model No. 6,604,853). Specific minimum radii of curvature are prescribed for such supply lines by the manufacturer; it is important not to fall below them in order to ensure reliable transport of the medium to be transmitted in the long term.

For this purpose the chain links are provided with stops, upon which the chain links are braced and which thus prevent the drag chain from falling below a certain radius of curvature in the region of its loop. It is therefore necessary to manufacture different chain links for different prescribed minimum radii of curvature of the supply lines, which makes the production and stockholding of the chain links extremely onerous. It is also necessary to respect precise tolerances for the stops, in order to obtain a specific radius of curvature. It is also found that with high movement frequencies and movement speeds, such as are encountered with maintenance units on open-end spinning machines for example, these stops are very heavily stressed, so that the radius of curvature laid down for the guide chain cannot be ensured in the long term.

It is therefore an object of the present invention to provide a support device to guide flexible supply lines which avoids these disadvantages.

SUMMARY OF THE INVENTION

The above and other objectives are accomplished according to the invention when the curvature of the loop is dictated by a return wheel which is constructed as a chain wheel and rolls freely upon that part of the guide chain connected to the stationary connection point. In this way, it is not the chain links which exclude falling below the prescribed minimum radius of curvature of the supply lines, but the chain wheel which performs this function, and which braces the guide chain in the return region formed by the loop. It is therefore unnecessary for the chain links to possess cooperating stops and they can be used for the widest variety of minimum radii of curvature of the supply lines, since a smaller or larger chain wheel is associated with the guide chain according to the requirements in each case. Overstressing of the lines is avoided by long-term observation of these minimum radii of curvature. Consequently, the supply lines are also free of the torsional stresses resulting from overstressing, which cause the supply lines to become superposed and thus cause a further increase in the stressing of the supply lines. It is therefore unnecessary for the chain links to possess dividing webs or the like between the individual supply lines, so that on using the chain wheel according to the invention, guided freely in the loop of the guide chain, it is not only possible to use smaller chain links, but the latter can furthermore be simpler in construction.

Depending upon the length of the movement path, upon the construction of the guide chain and upon the nature of the drive of the chain wheel together with the loop formed by the guide chain, it may be advantageous if a guide means is associated with the chain wheel. This guide means may be constructed in various ways, but should generate the lowest possible friction during the movement of the guide chain and of the chain wheel. According to a preferred embodiment of the subject of the invention the chain wheel is arranged vertically, however, the invention is not restricted to this arrangement. Thus, the chain wheel may also assume any other desired orientation, even an oblique one for example.

A horizontal arrangement of the chain wheel is extraordinarily advantageous for many purposes, since this is quite especially suitable for an underground installation. In this case, the end face of the chain wheel is conveniently constructed as a sliding surface upon which the chain wheel is braced by rolling contact elements, while these rolling contact elements may be arranged in the foundation for the chain wheel or also in the chain wheel itself.

It is advantageous in practice if the extended guide chain is located in a box-like rail. In this case, the guide means for the chain wheel is conveniently formed by a box-like rail at least partly housing the guide chain.

If the consumer requires a large number of supply lines, then the guide chain has very wide chain links. In order to stiffen such chain links it is customary to brace them in the transverse direction by webs. In contrast to the guide chains hitherto customary, in which these transverse webs are necessary even for small chain widths in order to prevent damage to the supply lines, these transverse webs only have the function of strengthening the wide chain links mechanically. In this case, the chain wheel is conveniently of multi-track construction for adaptation to this subdivision. It is advantageous in the case of large chain lengths and large chain widths if a separate guide chain is provided for each track of the chain wheel. This makes possible a further standardization of the chain links, whereby their production becomes even cheaper. The guide means of the chain wheel may then be provided between the guide chains.

The chain wheel need not be constructed as a solid wheel in every case; it is sufficient as a rule if the chain wheel is constructed as a ring.

The chain wheel according to the invention in the loop of the guide chain makes it possible for the designer to conform the chain links of the guide chain solely in accordance with requirements as regards dimensions of and stressing by the supply lines housed in it, whereas the prescribed minimum bending radius is not an operative factor in this context. It is sufficient to insert in each case the chain wheel appropriately dimensioned for the prescribed minimum bending radius. Nor is it necessary to exchange the guide chain if an additional supply line, which necessitates a larger minimum radius of curvature than the supply lines previously provided, is drawn into the guide chain subsequently for the consumer; the exchange of the chain wheel for one of adapted diameter is sufficiient for this purpose. Since the chain links do not have to fulfill any particular specifications as regards tolerances, any possible changes in them due to wear are also unimportant for the functional reliability and the protection of the supply lines passed through the guide chain.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 1 shows in side elevation a guide chain with a loop arranged in a vertical plane, which is braced by the chain wheel according to the invention, constructed as a ring;

FIG. 2 shows in cross-section a detail of a specific construction of the apparatus shown in FIG. 1;

DESCRIPTION OF A PREFERRED EMBODIMENT

Figure 3:
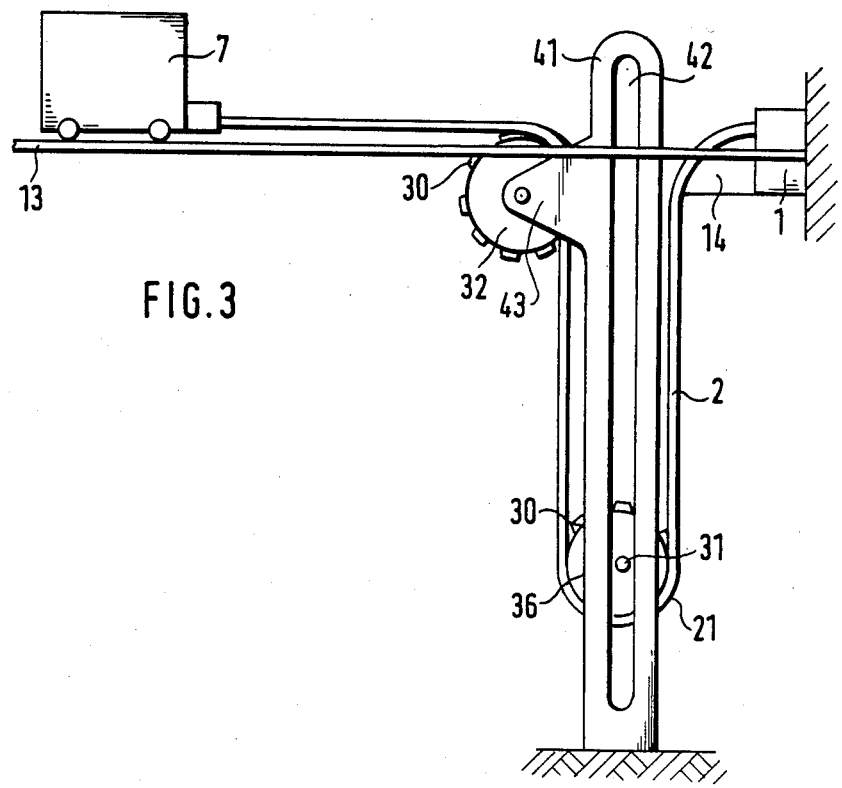
FIG. 3 shows in side elevation the application of the subject of the invention in the case of a horizontally mobile consumer and vertical construction of the loop of the guide chain.

The apparatus for guiding flexible supply lines 10, 11, etc., will first of all be discussed with reference to FIG. 1. These supply lines 10, 11, 12 (see also FIG. 4), which connect a stationary connection point 1 to a supply station 7 mobile relative thereto, can serve for the passage of electric current, but also of a gaseous, pulverulent, or liquid medium. The supply lines 10, 11, 12 are guided in the chain links 20 of a guide chain 2, the length of which corresponds to the distance which has to be bridged when the supply station 7 occupies its most remote limit position from the connection point 1. The surplus length is taken up during the movement of the supply station 7 in a loop 21, the size of which therefore varies as a function of the change of location of the supply station 7. The loop 21, wraps a chain wheel 3, which is in engagement by its teeth 30 with the chain links 20 of the guide chain 2 and therefore rolls together with the guide chain 2. Because the consumer is located higher than the connection point 1, the chain wheel 3 is arranged vertically. The chain wheel 3 is constructed as a ring in the embodiment shown for reasons of economy of material and of weight.

As FIG. 1 shows, the chain wheel 3 is wrapped by the guide chain 2 in the return region. Because the chain wheel 3 is in toothed engagement with the guide chain 2, the chain wheel 3 is compelled to follow the movement of the supply station 7, although the rolling speed of the guide chain 2 and hence of the chain wheel 3 is only half as great as the speed of the supply station 7, because the distance to be covered by the supply station 7 is divided into the two sections of the loop 21 of the guide chain 2.

When the supply station 7 moves away from the chain wheel 3, traction is exerted upon the upper section of the guide chain 2, whereby the guide chain 2 is made to roll. In the case of the opposite movement of the supply station 7, the latter exerts a thrust upon the guide chain 2. Of course, the guide chain 2 then sags due to its deadweight and to the weight of the supply lines 10, 11, 12 etc. accommodated on it, so that the two sections of the loop 21 of the guide chain 2 rest upon each other during the pushing movement. However, the sagging guide chain 2 forms the radius of curvature dictated by the wheel, so that there is no danger of falling below the minimum admissible radius of curvature of the supply lines 10, 11, 12 etc.

During the movement of the supply station 7 the guide chain 2 is laid down in a box-like rail 4. According to the length of the guide chain 2, this is not only the section of the guide chain 2 between the connection point 1 and the chain wheel 3, but also, particularly during the pushing movement, due to the weight it is the sagging intermediate region of that section of the guide chain 2 between chain wheel 3 and supply station 7 with the supply lines 10, 11, 12 etc. arranged therein.

In the embodiment illustrated, the side wall 40 of the box-like rail 4 has such a height that it accommodates both superposed sections of the guide chain 2. Thus, the side wall 40 of the rail 4 also extends up to the end faces 34, 37 of the chain wheel 3 (see FIG. 2), so that the box-like rail 4 forms a lateral guide means for the chain wheel 3.

In the embodiment illustrated, the supply station 7 moves horizontally and also parallel to the rail 4. However, it is also possible to move the supply station 7 on an inclined path and/or obliquely to the rail 4, if a sufficient wrapping of the chain wheel 3 by the guide chain 2 is then ensured. During the movement of the supply station 7, the chain wheel 3 is moved together with the guide chain 2 by the engagement of the teeth 30 into the chain links 20 in such a way that it is always located in the return region of the guide chain 2. The chain wheel 3 therefore ensures that that part of the guide chain 2 in which the supply lines 10, 11, 12 etc. arranged therein are most endangered, namely, its return region, is braced so that it is absolutely impossible to fall below the prescribed minimum radius of curvature of the supply lines 10, 11, 12 etc.

If adequate wrapping of the chain wheel 3 is ensured at all times, then the guide means may also be omitted in certain circumstances, although it is extremely advantageous, particularly in the case of heavy guide chains 2, for large radii of the chain wheels 3 or also where the apparatus is mounted on or attached to machines which don't run calmly. For apparatuses in which the loop 21 is used up at the greatest distance of the supply station 7 from the connection point 1, a guide means for the chain wheel 3 should be provided in order to prevent the chain wheel 3, when largely released from the guide chain 2, from tilting and moving out of engagement with the guide chain 2. It is sufficient for this purpose to guide the chain wheel 3 between two parallel walls.

FIG. 3 shows another exemplary embodiment with horizontal movement of the supply station 7 and vertical construction of a loop 21. The supply station 7 moves on a horizontal guide rail 13, whereas the chain wheel 36 is provided with a crank guide means 41 with a vertical guide slot 42, in which the chain wheel 36 is guided by means of its axis 31. In this case the chain wheel 36 possesses a hub, not shown, to accommodate the axis 31, for which purpose it is either constructed as a solid wheel, or else, in the case of an annular construction, has spokes to connect the ring to the hub.

The guide chain 2 is again connected to a stationary connection point 1 and is guided round via a stationary return guide means 14 to the chain wheel 36, from where the guide chain 2 is passed over a stationary chain wheel 32 to the supply station 7. In the exemplary embodiment illustrated, the crank guide means 41 possessing the guide slot 42 has a jib arm 43 which supports the stationary chain wheel 32. In this embodiment of the subject of the invention, the guide chain 2 is maintained taut due to gravity.

Figure 4:
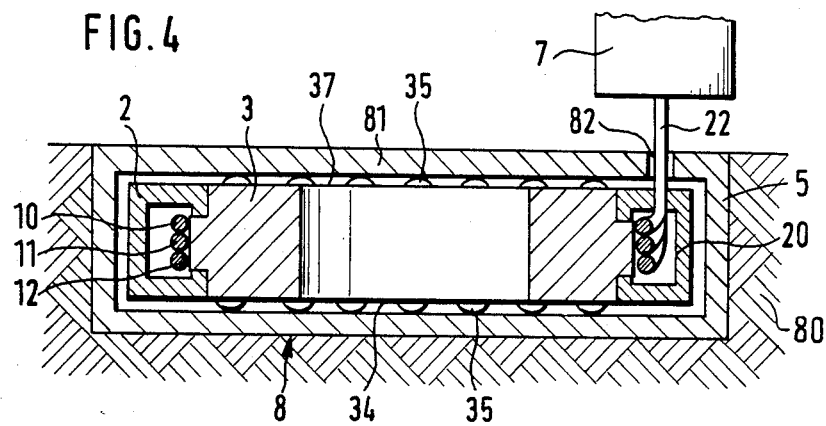
FIG. 4 shows in cross-section a construction of the subject of the invention which is particularly suitable for an underground arrangement.

It is possible in principle for the guide chain 2 to be passed in an encapsulated duct 8, namely irrespectively of the direction in which the chain wheel 3 or 36 is oriented (FIG. 4). Depending upon the available space conditions and upon the individual application, it is then frequently convenient to orient the loop 21 horizontally. Such an exemplary embodiment is illustrated in FIG. 4.

In this figure, an encapsulated duct 8 is provided to accomodate and guide the chain wheel 36 and the guide chain 2; in it the guide chain 2 is passed so that the two sections of the guide chain 2 forming the loop 21 cannot move farther apart than is the case in the taut state. Under the action of thrust it is therefore only possible for the two sections to come into mutual abutment, in a similar way to that already explained with reference to an embodiment according to FIG. 1, where such an abutment of the two chain sections is caused by sagging. According to FIG. 4, the duct 8 is provided in the floor 80 (that is to say underground). A chain link 20 is connected to the supply station 7 via a laterally attached driver 22, for which the top duct wall 81 has a longitudinal slot 82. Further rolling contact elements 35 may be provided between this top duct wall 81 and the upper end face 37 of the chain wheel 3.

In the illustrated underground arrangement of the guide chain 2 and of the chain wheel 3, the driver 22 is arranged on the side of the chain links 20, but it is self-evident that, depending upon the reciprocal arrangement of guide chain 2 and supply station 7, such a driver may also be provided on the radially external side of the guide chain 2. The longitudinal slot 82 is then provided accordingly in the duct 8, which may obviously also be provided above ground within an installation or machine.

In the case of radial guidance of the chain wheel 3 or 36, when the chain wheel is exchanged for one of different diameter, it is sufficient to adapt the guide means 5 to the new diameter by adjusting a side wall of the duct 8.

According to FIG. 4, the end face 34 of the chain wheel 3, constructed as a ring, is constructed as a sliding surface, upon which the chain wheel 3 is braced by rolling contact elements 35 (for example balls). In this case, it is not a decisive factor whether the rolling contact elements 35 are arranged in the chain wheel 3 or in the guide means 5. In the embodiment illustrated, the rolling contact elements 35 are arranged in the chain wheel 3, because fewer rolling contact elements 35 are required in this case than for an arrangement of the rolling contact elements 35 in the guide means 5.

When the guide chain 2 is maintained taut by the chain wheel 3 or 36 due to gravity and is not required to be driven by the guide chain 2, a multiple arrangement of juxtaposed loops 21 is also possible, in which case such a chain wheel 36, 32 must be provided at each return station (see also FIG. 3).

Where a large number of supply lines 10, 11, 12 etc. are provided, it may be advantageous to provide transverse webs 24 to stiffen the chain links 20; the former then also result, as an additional secondary effect, in the separation of the supply lines 10, 11, 12 etc. In such a case it is convenient to make the chain wheel 3 or 36 of multi-track construction. FIG. 2 shows such a construction of a chain wheel 3, as may be seen clearly by the teeth 30 and 38. In this case, the connection points 1 for each guide chain 2 or 23 may also be staggered in their direction of movement, although it must then be ensured that the chain wheel 3 or 36 is never moved beyond the connection point 1 located closest to itself.

According to service conditions and to the nature of the supply lines, it may be convenient to have different guide chains 2, 23 available for the supply station 7 (see FIG. 2). According to FIG. 2, these two guide chains 2, 23 are separated mutually by a guide means 44 which serves to guide the chain wheel 3 in addition to guiding the guide chains 2 and 23.

Further variations of the subject of the invention by exchanging individual features among themselves or for equivalents and combinations thereof fall within the ambit of the present invention.

What is claimed is:

1. An apparatus for guiding flexible supply lines, said apparatus comprising:
   a guide chain, connected to a stationary connection point on one end thereof and a mobile supply station on the other end thereof, for supporting said supply line; and
   a return wheel, with said guide chain wrapped at least partially thereon, for maintaining a minimum loop curvature of a length of chain wrapped thereon, said wheel including a chain wheel which rolls freely upon a part of said guide chain and is driven by movement of said guide chain, wherein surplus length of said guide chain is taken up and laid down in a loop during movement of said supply station.

2. Apparatus as claimed in claim 1 further including a guide means operatively associated with said chain wheel for guiding movement thereof.

3. Apparatus as claimed in claim 1 or 2, wherein said chain wheel is arranged to roll and move vertically.

4. Apparatus as claimed in claim 1 or 2, wherein the chain wheel is arranged to roll and move horizontally.

5. Apparatus as claimed in claim 2 wherein said guide means is formed by a box-like rail at least partly housing said guide chain.

6. An apparatus as in claim 2 wherein said chain wheel includes a plurality of side-by-side tracks.

7. An apparatus as in claim 6 wherein a separate guide chain is respectively provided for each of said tracks of said chain wheel.

8. Apparatus as claimed in claim 7, wherein said guide means for said chain wheel is arranged between the guide chains.

9. Apparatus as claimed in claim 1 wherein said chain wheel includes a plurality of side-by-side tracks.

10. Apparatus as claimed in claim 9, wherein a separate guide chain is provided for each track of said chain wheel.

11. Apparatus as claimed in claim 1 wherein said chain wheel is constructed as an annular ring member.

12. An apparatus as in claim 1, wherein said return wheel is driven alternately in opposite moving directions only by said guide chain, two parts of said chain encircling said return wheel by more than 180° at least during pushing movement of said guide chain towards said return wheel.

13. An apparatus as claimed in claim 1, wherein said return wheel intermeshes with said guide chain.

14. Apparatus for guiding flexible supply lines which are supported by a guide chain which is connected to a stationary connection point on one end and to a mobile supply station on an opposite end, a surplus length of the guide chain being taken up and laid down in a loop during movement of the supply station, wherein said apparatus comprises:
- a return wheel for maintaining a minimum loop curvature in said surplus length of said guide chain, said return wheel including a chain wheel having teeth which engage chain links of said guide chain, said chain wheel rolling freely upon a part of the guide chain connected to said stationary connection point and being driven by movement of said guide chain; and
- a guide means associated with said chain wheel for guiding the movement of said chain wheel and guide chain engaged thereby.

15. The apparatus of claim 10 wherein said guide means includes vertical guide means for guiding said chain wheel in a vertical direction.

16. The apparatus of claim 15 wherein said vertical guide means includes crank guide means having a vertical guide slot, said chain wheel having a slide axis which is received in said guide slot whereby said chain wheel is guided vertically.

17. The apparatus of claim 16 wherein said crank guide means includes a stationary chain wheel carried adjacent an end of said vertical guide slot which rotates about a stationary axis, said guide chain passing over said stationary chain wheel as said movable chain wheel moves up and down in said guide slot.

18. The apparatus of claim 14 wherein said guide means includes an encapsulated duct having side walls in which said chain wheel is encapsulated and guided.

19. Apparatus for guiding flexible supply lines which are supported by a guide chain which is connected to a stationary connection point on one end and to a mobile supply station on an opposite end, and the surplus length of the guide chain is taken up and laid down in a loop during the movement of the supply station, wherein said apparatus comprises:
- a return wheel for dictating the curvature of the loop of a length of the surplus chain which includes a chain wheel which rolls freely upon a part of said guide chain connected to said stationary connection point; and
- guide means associated with said chain wheel for guiding the movement of said chain wheel wherein;
- an end face of said chain wheel includes a sliding surface and a plurality of rolling contact elements bracing said chain wheel against said guide means.

20. Apparatus for guiding flexible supply lines which are supported by a guide chain which is connected to a stationary connection point on one end and to a mobile supply station on an opposite end, a surplus length of the guide chain being taken up and laid down in a loop during movement of the supply station, wherein said apparatus comprises:
- a return wheel for dictating the curvature of the loop in said surplus length of said guide chain which includes a chain wheel having teeth which engage the chain links of said guide chain;
- said chain wheel rolling freely upon a part of the guide chain connected to said stationary connection point; and
- a guide means associated with said chain wheel for guiding the movement of said chain wheel and guide chain engaged thereby, wherein;
- said guide means includes a box rail having vertical side walls and a bottom surface integrally connecting said side walls, said guide chain sliding on said bottom surface of said box rail, and said side walls of said box rail extending upwardly past said guide chain and end surfaces of said chain wheel to laterally guide said chain wheel therein.

21. Apparatus for guiding flexible supply lines which are supported by a guide chain which is connected to a stationary connection point on one end and to a mobile supply station on an opposite end, a surplus length of the guide chain being taken up and laid down in a loop during movement of the supply station, wherein said apparatus comprises:
- a return wheel for dictating the curvature of the loop in said surplus length of said guide chain which includes a chain wheel having teeth which engage the chain links of said guide chain;
- said chain wheel rolling freely upon a part of the guide chain connected to said stationary connection point; and
- a guide means associated with said chain wheel for guiding the movement of said chain wheel and guide chain engaged thereby, wherein;
- said guide means includes an encapsulated duct having side walls in which said chain wheel is encapsulated and guided; and
- said apparatus further includes roller contact means braced between the walls of said encapsulated duct and end surfaces of said chain wheel whereby said chain wheel rolls relative to said encapsulated duct walls.

* * * * *